J. Dickason,
Automatic Gate,
Nº 65,354. Patented June 4, 1867.
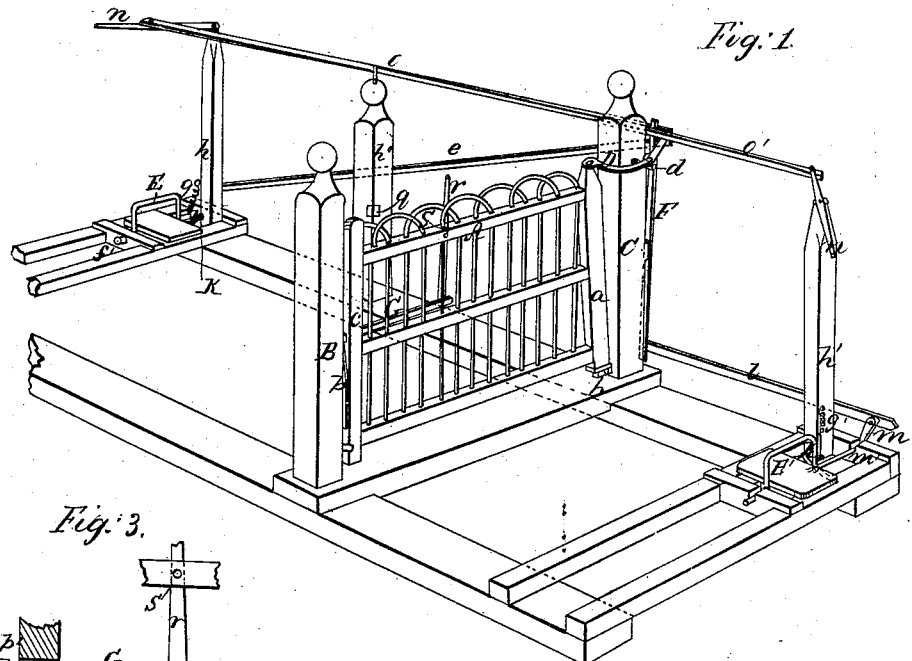
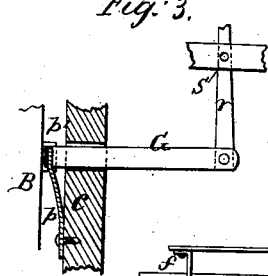
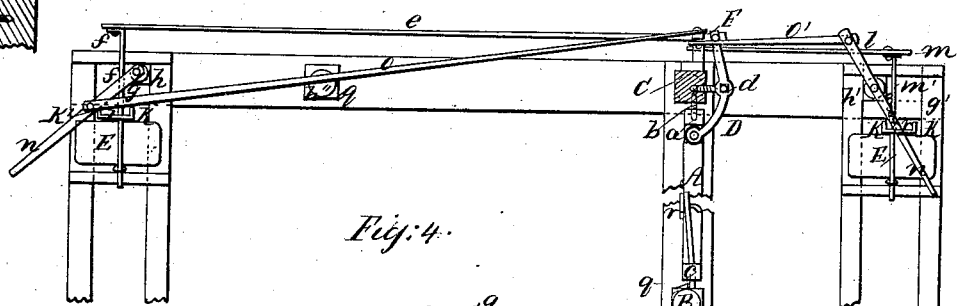
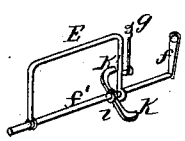
Witnesses:
Charles L. Fisher
John Van Achy
Inventor,
John Dickason

United States Patent Office.

JOHN DICKASON, OF VEVAY, INDIANA.

Letters Patent No. 65,354, dated June 4, 1867.

---

GATES.

---

The Schedule referred to in these Letters Patent and making part of the same.

---

TO ALL WHOM IT MAY CONCERN:

Be it known that I, JOHN DICKASON, of Vevay, Switzerland county, and State of Indiana, have invented certain new and useful Improvements in Gates, of which the following is a full and clear description, reference being had to the accompanying drawing, making part of this specification.

My improvements in gates relate to that class usually termed "Approach Openers," in which the opening and closing mechanism is so arranged that the gate may be opened and closed by the passing vehicle, and also to a spring-latch which secures the gate when closed.

Figure 1 is a perspective view of a gate having my improvements connected therewith.

Figure 2 is a plan of the same.

Figure 3 represents, in elevation, the spring-latch which I employ to secure the gate.

Figure 4 is a detail view of the rotating-lever by means of which the passing vehicles open and close the gate.

The gate A, arranged between the posts B and C, to the latter of which it is hinged. The foot of the hinge-bar $a$ of the gate A is stepped upon the adjustable bolt $b$ secured to the post C. The upper end of the hinge-bar $a$ inclines toward the latch-bar $c$ of the gate, and has pivoted to it one end of the circular lever-bar D, having its fulcrum upon the head of the adjustable bolt $d$, which is tapped into the side of the post C in the same manner as is the bolt $b$. The axes of the bolts $b$ and $d$ are at right angles to each other, for the purpose of adjusting the gate to the post C, about which it swings. The outer end of the circular lever-bar D is pivoted to the connecting-rod or bar $e$. The bar $e$ is pivoted at its opposite end, which is near the ground, to the crank $f$ of the crank-shaft $f'$, to which is pivoted the U-shaped lever E. It projects above the ground, and is held in a vertical position by the spring $g$, the spring $g$ being secured to the U-shaped lever E and post $h$. The dog $i$ is secured to the crank-shaft $f'$. It is provided with stops $k$ $k'$ which are engaged by the lever E when the gate is opened or closed. The connecting-bar $e$ is pivoted to the vertical lever F at a point near its connection with the circular lever-bar D. The vertical lever F is pivoted, midway in its length, to the outer face of the post C. To the lower end of the lever F is pivoted the connecting-bar $l$. The bar $l$ is pivoted at its outer end to the crank $m$. The crank $m$ is operated by the U-shaped lever-bar E', which engages the stops secured to the dog $i'$, the dog $i'$ being keyed or otherwise made fast to the crank-shaft $m'$. The U-shaped lever-bar E' is maintained in a vertical position above the surface of the roadway by spring $g'$, attached to the post $h'$, and the lever-bar E'. Upon the tops of the posts $h$ and $h'$ are pivoted the lever-handles $n$ $n'$. The short and outer arm of each lever-handle $n$ and $n'$ is attached to the connecting-bar $o$ and connecting-bar $o'$ respectively. These connecting-bars $o$ and $o'$ are pivoted to the vertical lever F immediately above its connection with the connecting-bar $e$. The latch G passes through a mortise in the latch-bar $c$ of the gate A at a suitable distance above the ground. Its end without the gate is secured to the spring $p$ by the clamping-strap $p'$. The spring $p$ is firmly secured to the latch-bar $c$. It is designed to keep the latch well out to engage the detaining-strips $q$ located on the posts B and $h$. The hand-lever $r$ is pivoted to the upper rail of the gate A at $s$. The lower end of the hand-lever $r$ is pivoted to the inner end of latch G.

In approaching the gate in one direction the wheels of the vehicle press to the ground the U-shaped lever E, causing it, in its rotation upon the crank-shaft $f'$, to engage the stop $k$ of dog $i$, thereby rotating the crank $f$, and through the connecting-bar $e$, which, operating the circular lever-bar D, throws the top of hinge-bar $a$ towards the posts $h$ and C. The latter motion elevates the free end of the gate, disengages the latch G from the detaining-strip $q$ on post B, allowing the gate to revolve, when its centre of gravity is caused to pass between the adjustable bolt $b$, which pivots the foot of the hinge-bar $a$ of the gate, and the post $h$. The gate having swung open, the latch-bar $c$ is sprung behind the detaining-strip $q$ on post $h''$, whereby the gate is kept open until the vehicle has passed through and the wheels depressed the U-shaped lever-bar E', when, by means of the motion imparted to the circular lever-bar D, through the connecting-bar $l$ and vertical lever F, the free end of the gate is disengaged from the detaining-strip $q$ upon post $h''$, and is closed. The springs $g$ and $g'$ cause, by their elasticity, the U-shaped lever-bars E and E' to resume the vertical position after the passage of the vehicle.

The equestrian, to pass through the gateway, presses the free ends of the lever-handles $n$ and $n'$ in the direction he is moving, when the gate will alternately swing open and shut, since the lever-handles $n$ and $n'$ are in direct communication with the circular lever-bar D which operates the gate; or the gate may be opened by pressing the hand-lever $r$, thus springing back the latch-bar $c$, and then revolving the gate towards the post $h''$ when it will close from the displacement of its centre of gravity. It is frequently necessary to reset the gate-post C, on account of the inclination of the post toward the roadway causing the gate to drag upon the ground, seriously impeding its opening. This defect is easily remedied by means of my adjustable bolts, $b$ and $d$, which have screw-ends, and may be, by a few turns, made to change the inclination of the gate, and not only prevent the dragging of the free end upon the ground, but so adjust the gate that it may be opened and closed with the least expenditure of force.

I am aware that gates have been constructed with the hinge-bar $a$ inclined at the top from the post to which the gate is hinged, and also that wheel-levers, connected with ratchet-bars, pinions, and links, have been employed in the mechanism for opening and closing gates, to which devices and constructions I make no claim; but what I claim as new, and of my invention, is—

1. The system of lever-handles $n$ and $n'$, connecting-bars $o$ and $o'$, and circular lever-bar D, in combination with the gate A, all arranged and operating substantially as and for the purpose specified.

2. In combination with the gate A and the U-shaped lever-bars E and E', which operate the cranks $f$ and $m$, the connecting-bars $e$ and $l$, and the vertical lever F and circular lever-bar D, arranged and operated substantially as described.

3. The adjustable screw-bolts $b$ and $d$, circular lever-bar D or its equivalent, the post C and gate A, arranged substantially as herein described and for the purpose specified.

4. The latch G, consisting of the latch-bar $c$, secured to the spring $p$ by the clamping-strap $p'$ and the hand-lever $r$, as described and for the purpose set forth.

JOHN DICKASON.

Witnesses:
    CHARLES L. FISHER,
    JOHN VAN ACHEY.